United States Patent
Cornell

(10) Patent No.: US 6,297,886 B1
(45) Date of Patent: Oct. 2, 2001

(54) TANDEM PRINTER PRINTING APPARATUS

(76) Inventor: John S. Cornell, 100 Wolfpit Ave., Unit 26, Norwalk, CT (US) 06851

( * ) Notice: Subject to any disclaimer, the term of this patent is extended or adjusted under 35 U.S.C. 154(b) by 592 days.

(21) Appl. No.: 08/659,143

(22) Filed: Jun. 5, 1996

(51) Int. Cl.⁷ .................................................. G06F 15/00
(52) U.S. Cl. ...................... 358/1.12; 358/1.13; 358/1.15; 358/296; 399/364; 399/384; 399/16
(58) Field of Search .................................. 395/111, 109, 395/114, 112; 358/296; 399/364, 374, 375, 384, 381, 306, 361, 16, 124; 355/219, 309, 319, 23, 24

(56) References Cited

U.S. PATENT DOCUMENTS

| | | |
|---|---|---|
| 3,536,398 | 10/1970 | Bhagat . |
| 3,580,670 | 5/1971 | Bhagat . |
| 3,862,802 * | 1/1975 | Till ............................................ 355/24 |
| 3,940,210 | 2/1976 | Donohue . |
| 3,944,359 | 3/1976 | Fisk et al. . |
| 3,944,360 | 3/1976 | Deetz et al. . |
| 4,120,034 | 10/1978 | Fisk et al. . |
| 4,194,832 | 3/1980 | Tabayashi . |
| 4,348,101 * | 9/1982 | Schonfeld et al. ....................... 355/24 |
| 4,591,884 | 5/1986 | Miyamoto et al. . |
| 4,774,524 * | 9/1988 | Warbus et al. .......................... 358/296 |
| 4,796,066 | 1/1989 | Morris et al. . |
| 4,881,132 * | 11/1989 | Lajos ....................................... 358/296 |
| 4,958,187 | 9/1990 | Tsuchiya et al. . |
| 4,972,236 * | 11/1990 | Hasegawa ................................ 355/23 |
| 5,140,674 * | 8/1992 | Anderson et al. ...................... 395/111 |
| 5,144,386 * | 9/1992 | Matsuo et al. ........................... 355/23 |
| 5,179,417 | 1/1993 | Sugaya et al. . |
| 5,467,179 * | 11/1995 | Boeck et al. ........................... 355/309 |
| 5,548,390 * | 8/1996 | Sugisaki et al. ....................... 355/319 |
| 5,568,246 * | 10/1996 | Keller et al. ........................... 355/309 |
| 5,596,416 * | 1/1997 | Barry et al. ............................ 399/381 |

* cited by examiner

Primary Examiner—Edward Coles
Assistant Examiner—Mark Wallerson
(74) Attorney, Agent, or Firm—R. Neil Sudol; Henry D. Coleman; William J. Sapone

(57) ABSTRACT

A printing assembly comprises a first printer for printing documents encoded in computer generated signals and a second printer for printing documents encoded in computer generated signals, the documents including alphanumeric characters, charts and graphics. The printers are disposed one above the other and are connected in tandem to one another via a multiple-page continuous web of paper extending along a U- or C-shaped path from a paper output port of the first printer to a paper feed port of the second printer. A computer for generating a signal encoding a multiple page document is coupled via connection componentry to the printers for transmitting odd pages in encoded form to one of the printers and even pages to the other printer.

18 Claims, 3 Drawing Sheets

TANDEM PRINTER PRINTING APPARATUS

BACKGROUND OF THE INVENTION

This invention relates to an apparatus for two-sided printing. More particularly, this invention relates to an assembly responsive to computer generated signals for printing a document on two sides.

At the present time, thousands of banks, brokerage houses and other financial institutions are printing millions of weekly, bi-weekly and monthly statements on one side of pre-printed statement forms. For the most part, these statements are printed off of mainframe or large-scale minicomputers. Affordable printers capable of handling mainframe and mini-computer output are either chain or dot-matrix printers. Consequently, printing both sides of paper having the conventional quality would masticate the paper.

Conventional two-sided photocopying and book printing present problems which have perhaps inhibited efforts to develop two-sided printing of financial type statements. Such problems include a warping of the paper which results from the high levels of heat employed. More moisture flees from the side of the paper in contact with the heated elements than from the more remote side of the paper. In addition, the deposition of electrostatic charges causes the paper sheets to cling to one another and to other surfaces. Both the warping of the paper sheets and the deposited electrostatic charge cause paper jams in the machinery. Avoiding or clearing the paper jams requires personnel to be present to monitor and correct problems as they occur. Sometimes, papers printed on one side are placed aside for flattening prior to printing on the opposite side. Such efforts increase costs and delay the production of the desired documents.

OBJECTS OF THE INVENTION

An object of the present invention is provide a printing system or assembly for printing two-sided documents in response to computer-generated signals encoding the documents.

Another object of the present invention is to provide such a system or assembly which can handle mainframe and other large-scale computer output.

A further object of the present invention is to provide such a system or assembly which prints on each side of a sheet of paper in real time.

Yet another object of the present invention is to provide such a system or assembly which can utilize laser printer technology and basic or conventional printer driver programming.

An additional object of the present invention is to provide such a system or assembly which is simple to manufacture, assemble and implement.

These and other objects of the present invention will be apparent from the descriptions and drawings hereof.

BRIEF DESCRIPTION

A printing assembly comprises, in accordance with a general embodiment of the present invention, a first printer for printing documents encoded in computer generated signals and a second printer for printing documents encoded in computer generated signals. The documents generally include alphanumeric characters, charts and graphics. A computer for generating a signal encoding a multiple page document is coupled via connection componentry to the printers for transmitting odd pages in encoded form to one of the printers and even pages to the other printer.

The paper used by the printing assembly may be a series of paper sheet portions connected to one another in a continuous web of paper. In that event, the printers are connected in tandem to one another via the multiple-page continuous paper web. The web extends from a paper output port of the first printer to a paper feed port of the second printer.

Preferably, the printers are disposed one above the other, the web of paper being simply inverted in a U or C shape between the output port of the first printer and the paper feed port of the second printer. A tensioning device may be placed in contact with the web between the paper output port of the first printer and the paper feed port of the second printer for guiding the web and providing it with a predetermined amount of tension. The tensioning device exemplarily includes a spring loaded, electrically conductive element such as a roller which is electrically grounded to siphon away electrostatic charge deposited on the paper by the first printer.

Preferably, the connection componentry includes a page splitting module for detecting odd pages and even pages in the document and separating odd pages from even pages. The connection componentry further includes a synchronizer for timing the operation of the first printer and the second printer so that opposite sides of essentially every sheet portion bear consecutive pages. The connection componentry may additionally include an electronic buffer.

In a more specific embodiment of the present invention, the printers are off-the-shelf components, preferably desktop type laser printers.

A device for enabling two-sided printing comprises, pursuant to another embodiment of the present invention, a page-splitting component for detecting odd pages and even pages in a document encoded in a computer-generated signal and for separating odd pages and even pages in the document. A first coupling element connects an input of the page-splitting component to a computer, while a second coupling element connects an output of the page-splitting component to a first printer and a third coupling element connects another output of he page-splitting component to a second printer.

In accordance with another feature of the present invention, a timing module is operatively connected to the page spitting component and at least one of the coupling elements for timing the operation of the printers so that opposite sides of a plurality of paper sheet portions fed from the paper output port of one printer to the paper feed port of the other printer bear consecutive pages. The timing module includes a delay for transmitting pages of a given document over the one coupling element only after lapse of a predetermined interval after an initial transmission of pages of the document over the other coupling element.

In a printing method in accordance with the present invention, a first printer for printing documents encoded in computer generated digital signals is disposed in tandem to a second printer for printing documents encoded in computer generated digital signals. A computer for generating a digital signal encoding a multiple page document is operatively connected to data inputs of the two printers. Odd pages of the multiple page document are then transmitted in encoded form from the computer to one of the printers and even pages of the multiple page document are transmitted from the computer to the other printer. The printers then print the respective even and odd pages on opposing sides of paper sheets which are guided from a paper output port of a first printer to a paper feed port of the other printer.

Generally, the paper sheets are provided in a Z-fold type continuous web. The web extends from the paper output port of the first printer to the paper feed port of the second printer Pursuant to a feature of the present invention, the connecting of the computer to the printers includes connecting an output terminal of the computer to an input terminal of a buffer interface and also connecting the buffer interface to the data inputs of the printers. The buffer interface is then operated to detect odd pages and even pages in the document and to separate odd pages from even pages. In addition, the buffer interface is operated to time or synchronize the operation of the printers so that opposite sides of essentially every sheet portion of the paper web bear consecutive pages.

In accordance with another feature of the present invention, the printers are disposed one above the other. Where a continuous web of paper is used, the web is simply inverted in a U or C shape between the output port of the first printer and the paper feed port of the second printer. A guide such as a tensioning roller is placed in contact with the web between the output port of the first printer and the feed port of the second printer. Where the paper sheets are separate, a guide such as an arcuate or curved surface is provided to direct the paper sheets from the first printer to the second printer.

A printing system or assembly in accordance with the present invention is a high-volume printing system which can print customer data, e.g., on financial statements, in real time, using black and white laser printing technology and basic or conventional printer driver programming.

A printing system or assembly in accordance with the present invention reduces the number of sheets of paper necessary to print financial statements by 50% or more, concomitantly reducing printing and mailing costs. In addition, the system eliminates the need to use expensive pre-printed paper stock for financial statements. Logos may be printed on the front of each sheet in real time, while legal compliance information is printed only on the last face of a statement. The quality of the printed characters may be significantly improved over conventional methods of statement printing, up to the highest laser standards. Moreover, development costs can be substantially decreased through the utilization of existing (off-the-shelf) laser printer engines (preferably using powerful RISC processors).

A printing system or assembly for printing two-sided documents in accordance with the present invention can handle mainframe and other large-scale computer output. The printing occurs without essential delay (in real time) in response to computer generated signals. In contrast, in photocopying and other printing methods, there is a substantial delay between printing of one side and printing of the opposing side.

A system or assembly in accordance with the present invention can utilize laser printer technology and basic or conventional printer driver programming.

DESCRIPTION OF THE PREFERRED EMBODIMENTS

Figure 1:
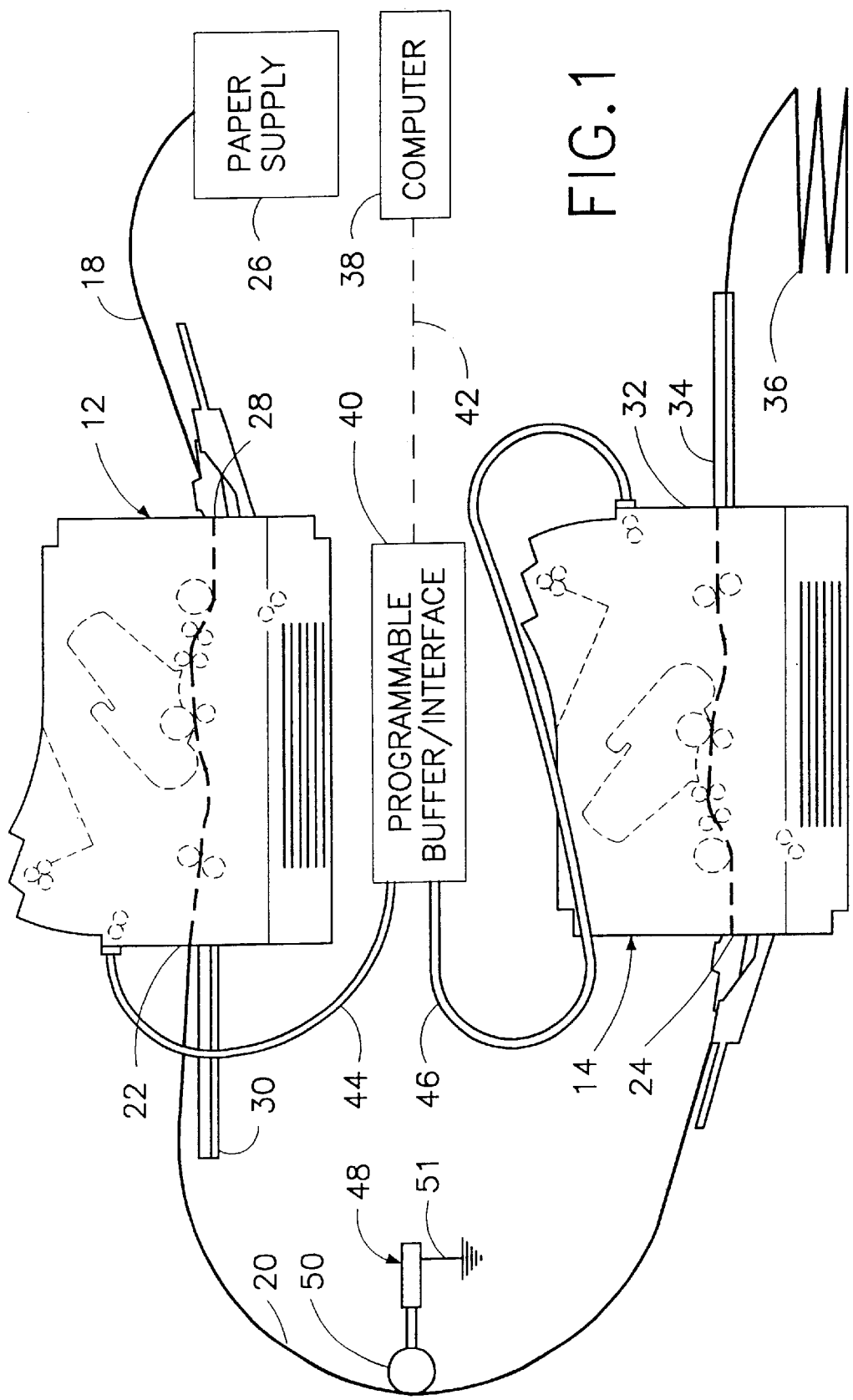
FIG. 1 is a schematic side elevational view, partly in block diagram form, of a printing system in accordance with the present invention.

As illustrated in FIG. 1, a printing assembly or system comprises a pair of printers 12 and 14 disposed one above the other, for example, on shelves of a cart or rack (not illustrated). Printers 12 and 14 are preferably laser printers for printing documents (alphanumeric characters, charts and graphics) encoded in computer generated signals. More specifically, printers 12 and 14 are off-the-shelf desktop-type laser printers.

Printers 12 and 14 are connected in tandem to one another via a multiple-page continuous paper web 18 extending along a U- or C-shaped path 20 from a paper output port 22 of a first printer 12 to a paper feed port 24 of the second printer 14. Paper web 18 is stored in a Z-fold configuration (not shown) in a paper supply container 26 and is fed from that container to a paper feed port 28 of the first printer 12. Generally, web 18 comprises a series of sheet portions (not shown) connected end to end.

At paper output port 22, a rear door 30 of the first printer 12 is unlatched and left in an opened configuration, to facilitate a guiding of paper web 18 along path 20 so that the paper turns from an upside-up to an upside-down orientation. Similarly, at a paper output port 32 of second printer 14, a rear door 34 of the second printer is kept opened to facilitate a feeding of the paper web 18 to a Z-fold stack 36. Of course, switches or other sensors (not shown) provided in printers 12 and 14 for disabling the printing process when doors 30 and 34 are opened are themselves disabled, bypassed or otherwise neutralized to enable the execution of printing operations.

As further illustrated in FIG. 1, the printing assembly or system also comprises a mainframe, desktop, mini, or LAN server computer 38 which, in addition to other normal functions, generates a digital signal encoding a multiple page document such one or more ganged bank or financial statements. Computer 38 is coupled to printers 12 and 14 via a programmable buffer/interface 40. Buffer/interface 40 is connected at an input to computer 38 via a cable 42 for receiving, from the computer, the digital signal encoding the multiple page document. Buffer/interface 40 detects page breaks in the document and determines which pages are odd and which are even. Pursuant to that determination, buffer/interface 40 transmits odd pages to a data input of printer 12 over a cable 44 and even pages to a data input of printer 14 over a cable 46.

As additionally illustrated in FIG. 1, a tensioning device 48 is placed in contact with paper web 18 between paper output port 22 of printer 12 and paper feed port 24 of printer 14, for providing web 18 along path 20 with a predetermined amount of tension. Tensioning device 48 includes a spring loaded, electrically conductive roller 50 which is electrically grounded at 51 to remove electrostatic charge deposited on paper web 18 by printer 12.

Figure 2:
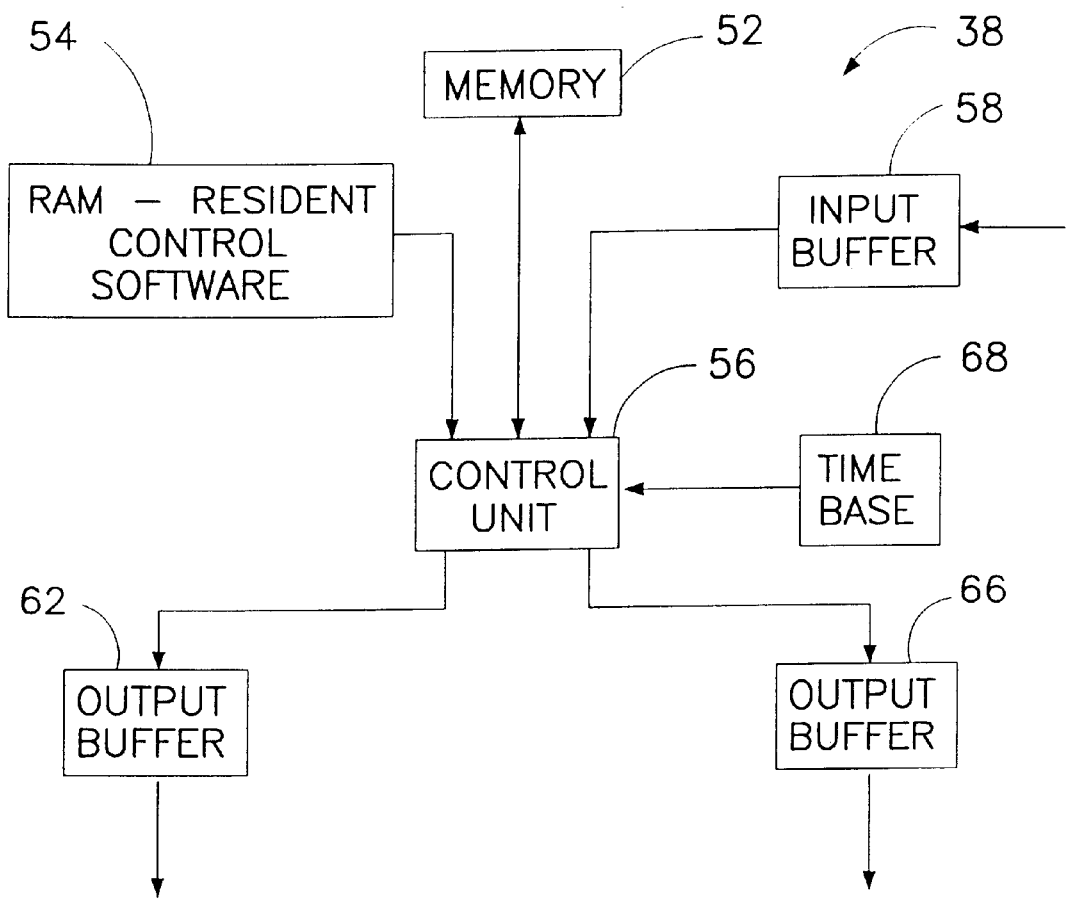
FIG. 2 is a block diagram of a programmable buffer/interface shown in FIG. 1.

As shown in FIG. 2, buffer/interface 40 includes a memory 52 which stores decoding instructions for different types of computers and different database programs. In response to instructions from RAM resident control software 54, a control unit 56 accesses memory 52 to enable the control unit to detect different pages of the multiple page document received by buffer/interface 40 from computer 38 over cable 42. The incoming multiple page document is temporarily stored in a buffer 58 which, together with cable 42, couples computer 38 to control unit 56.

Figure 3:
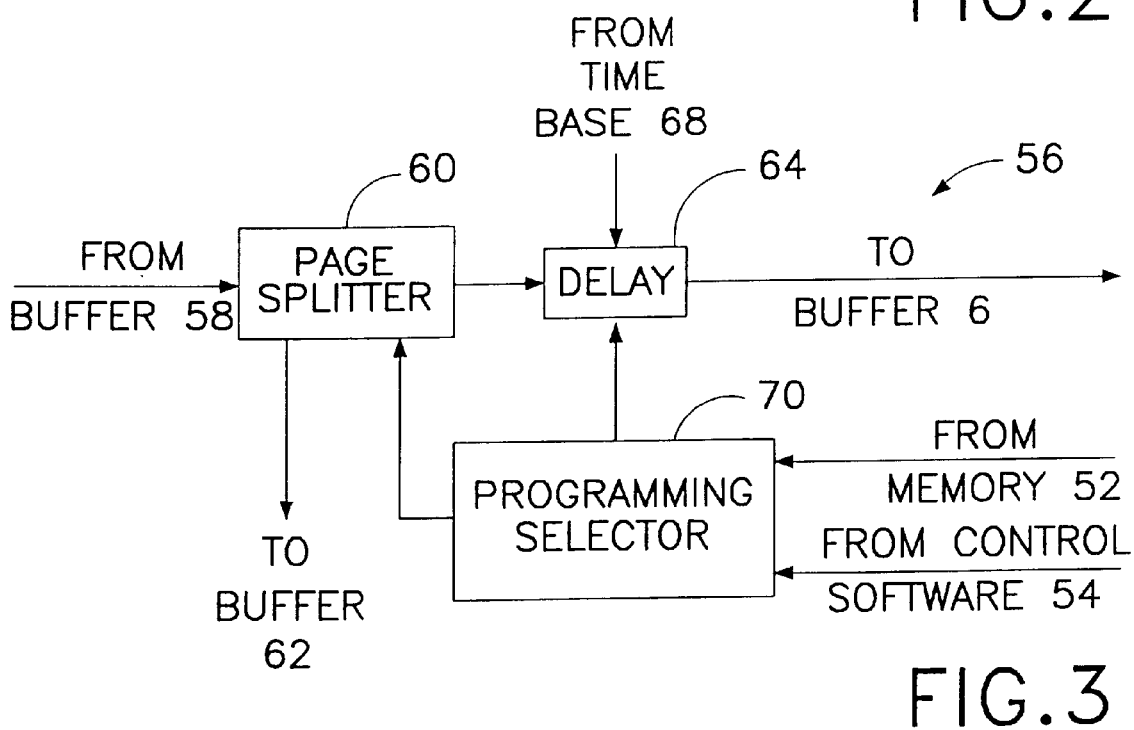
FIG. 3 is a block diagram of a control unit shown in FIG. 2.

As depicted in FIG. 3, control unit 56 includes a page splitting module 60 which detects and splits the odd pages from the even pages in the multiple page document generated by computer 38. Page splitter module 60 feeds the odd pages in sequence to printer 12 via an output buffer 62 (FIG. 2) and feeds the even pages in sequence to printer 14 via a delay 64 (FIG. 3) and an output buffer 66. Buffers 62 and 66, together with cables 44 and 46, couple page splitter module 60 to printers 12 and 14.

Under the control of a timing signal from a time base 68, delay 63 postpones the transmission of the even page sequence to printer 14 by an interval substantially equal to the transit time of paper web 18 from paper output port 22 of printer 12 to paper feed port 24 of printer 14, thereby synchronizing the operation of the two printers so that opposite sides of essentially every sheet of web 18 bear consecutive pages.

As further depicted in FIG. 3, control unit 56 includes a programming selector 70 which selects prestored document decoding instructions from memory 52 in response to a selection made by RAM-resident software 54. Software 54 senses and communicates to programming selector 70 the type of machine that computer 38 is or the type of operating system used by computer 38, as well as the identity of the database or word processing program which computer 38 uses to generate the multiple page document. This information permits control unit 56 and, more specifically, programming selector 70 and page splitter 60 to analyze the multiple page document for page breaks.

RAM-resident software 54 may also be used to inform control unit 56 of the type of printers connected to buffer/interface 40 and possibly an approximate distance along path 20 from output port 22 to paper feed port 24. The input of the approximate distance along path 20 enables control unit 56 to modify the timing of the second printer's operation relative to the first printer's operation. To that end, programming selector 70 is connected to delay 64, as depicted in FIG. 3.

Figure 4:
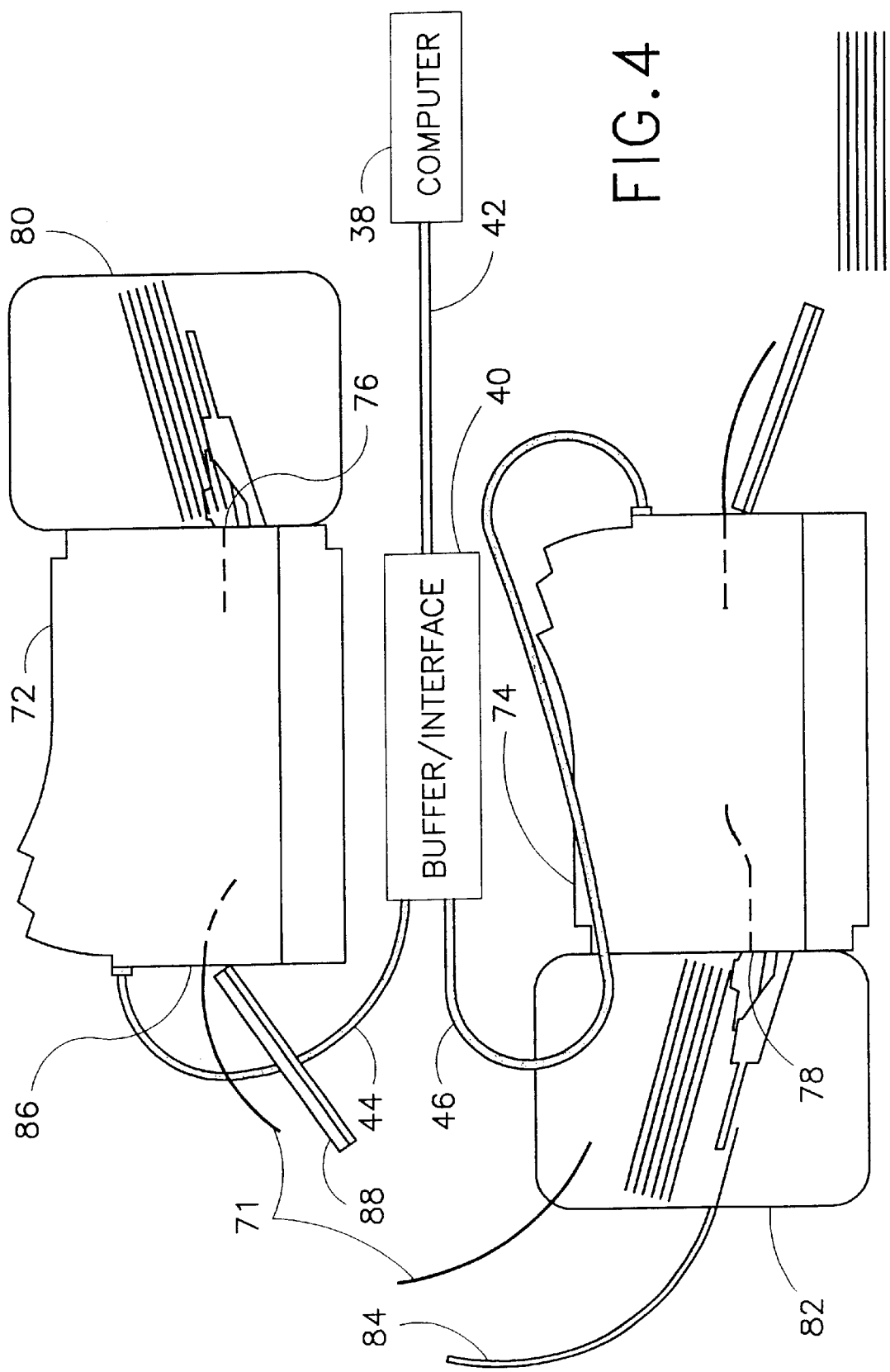
FIG. 4 is a schematic side elevational view, partly in block diagram form, of a modified printing system in accordance with the present invention.

FIG. 4 illustrates another printing assembly or system for two-sided printing on separate paper sheets 71 comprises a pair of printers 72 and 74 disposed one above the other on shelves of a cart or rack (not illustrated). Printers 72 and 74 are essentially identical to printers 12 and 14 except that printers 72 and 74 are provided at their paper input ports 76 and 78 with respective paper stackers 80 and 82. In addition, the second printer 74 is provided with an arcuate paper guide or surface 84 removably attached to paper stacker 82 for guiding paper sheets 71 from a paper output port 86 of printer 72 to stacker 82 so that the paper sheets are turned over in transit from output port 86 to input or feed port 78. A door 88 at output port 86 is angled downwardly and also serves a paper guiding function. Otherwise, the assembly of FIG. 4 is structurally essentially identical to the assembly or system of FIG. 1. Like reference numerals in FIGS. 1 and 4 denote identical structural components.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A printing assembly comprising:
 a desktop-type first laser printer;
 a desktop-type second laser printer, at least a portion of said second laser printer being disposed vertically below a portion of said first laser printer;
 a computer for generating a digital signal encoding a multiple page document;
 connection means connecting said computer to said first laser printer and said second laser printer for transmitting odd pages of said document to said first laser printer and even pages of said document to said second laser printer; and
 guide means for guiding separate sheets of paper in a single U- or C-shaped arc from a paper output port of one of said first laser printer and said second laser printer to a paper feed port of the other of said first laser printer and said second laser printer so that the separate sheets of paper are simply inverted during passage from said output port to said feed port.

2. The printing assembly set forth in claim 1 wherein said connection means includes page splitting means for detecting odd pages and even pages in said document and separating odd pages from even pages, said connection means further including synchronizing means for timing the operation of said first laser printer and said second laser printer so that opposite sides of essentially every sheet portion bear consecutive pages.

3. The printing assembly set forth in claim 1 wherein said connection means includes an electronic programmable buffer-interface.

4. The printing assembly set forth in claim 1 wherein said first laser printer and said second laser printer are off-the-shelf components.

5. The printing assembly set forth in claim 1 wherein said guide means include an arcuate surface extending up from said paper feed port generally towards said paper output port.

6. The printing assembly set forth in claim 5 wherein said guide means further include an opened door at said paper output port.

7. A printing assembly comprising:
 a first printer for printing documents encoded in computer generated digital signals;
 a second printer for printing documents encoded in computer generated digital signals;
 a computer for generating a digital signal encoding a multiple page document; and
 connection means connecting said computer to said first printer and said second printer for transmitting odd pages of said multiple page document in encoded form to one of said first printer and said second printer and even pages of said multiple page document to the other of said first printer and said second printer,
 said first printer and said second printer being disposed one above the other, said first printer being connected in tandem to said second printer via a multiple-page continuous web of paper extending from a paper output port of said first printer to a paper feed port of said second printer, said web of paper being simply inverted in a U or C shape between said output port and said paper feed port.

8. The printing assembly set forth in claim 7, further comprising a tensioning device for providing a strip of said web between said paper output port and said paper feed port with a predetermined amount of tension.

9. The printing assembly set forth in claim 8 wherein said tensioning device places an electrically grounded element in contact with said web.

10. The printing assembly set forth in claim 7 wherein said connection means including page splitting means for detecting odd pages and even pages in said document and separating odd pages from even pages, said connection means further including synchronizing means for timing the operation of said first printer and said second printer so that opposite sides of essentially every printed sheet portion bear consecutive pages.

11. The printing assembly set forth in claim 7 wherein said connection means includes an electronic programmable buffer-interface.

12. A printing method comprising:

providing:
   a first printer for printing documents encoded in computer generated digital signals;
   a second printer for printing documents encoded in computer generated digital signals; and
   a computer for generating a digital signal encoding a multiple page document;

disposing said first and second printer essentially one above the other;

operatively connecting said computer to data inputs of said first printer and said second printer;

transmitting odd pages of said multiple page document in encoded form from said computer to one of said first printer and said second printer and even pages of said multiple page document from said computer to the other of said first printer and said second printer;

guiding paper sheet portions from a paper output port of said first printer in a single U- or C-shaped arc to a paper feed port of said second printer; and operating said first printer and said second printer to print on opposite sides of a plurality of said paper sheet portions so that opposite sides of essentially every printed sheet portion bear consecutive pages.

13. The printing method set forth in claim 12 wherein the connecting of said computer to said first printer and said second printer includes connecting an output terminal of said computer to an input terminal of a buffer interface and connecting said buffer interface to said data inputs of said first printer and said second printer.

14. The printing method set forth in claim 12, further comprising operating said buffer interface to detect odd pages and even pages in said document and to separate odd pages from even pages, also comprising operating said buffer interface to time the operation of said first printer and said second printer so that opposite sides of essentially every sheet portion bear consecutive pages.

15. The printing method set forth in claim 12, wherein said paper sheet portions are connected to one another in a continuous web of paper.

16. A printing system comprising:

a desktop-type first laser printer assembly;

a desktop-type second laser printer assembly, said first laser printer and said second laser printer being disposed one above the other;

a digital processor operatively connected to said first laser printer assembly and said second laser printer assembly, said processor being programmed to detect odd pages and even pages in an electronically encoded document, to separate odd pages from even pages, and to transmit odd pages of said document to said first laser printer assembly and even pages of said document to said second laser printer assembly; and paper guide means disposed between said first laser printer assembly and said second laser printer assembly for guiding separate sheets of paper in a single U- or C-shaped arc from said first laser printer assembly to said second laser printer assembly.

17. The system defined in claim 16 wherein a paper output port of said first laser printer assembly and a paper feed port of said second laser printer assembly are located in substantial vertical alignment.

18. The system defined in claim 17 wherein said paper output port is located above said paper feed port, said guide means including an arcuate surface extending up from said paper feed port generally towards said paper output port.

* * * * *